United States Patent
Bowers et al.

(10) Patent No.: US 7,254,528 B2
(45) Date of Patent: Aug. 7, 2007

(54) TOOL FOR DEFINING VERBS AND ADVERBS IN A FAULT INJECTION TEST CREATION ENVIRONMENT

(75) Inventors: Wayne J. Bowers, Fremont, CA (US); Andrew A. Rutz, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 854 days.

(21) Appl. No.: 10/365,684

(22) Filed: Feb. 12, 2003
(Under 37 CFR 1.47)

(65) Prior Publication Data

US 2003/0216903 A1 Nov. 20, 2003

Related U.S. Application Data

(60) Provisional application No. 60/380,421, filed on May 14, 2002.

(51) Int. Cl.
*G06F 17/20* (2006.01)

(52) U.S. Cl. .......................................................... 704/9
(58) Field of Classification Search .................... None
See application file for complete search history.

(56) References Cited

U.S. PATENT DOCUMENTS 5,710,866 A * 1/1998 Alleva et al. ............ 704/256.4
6,487,545 B1 * 11/2002 Wical ........................... 706/45

* cited by examiner

*Primary Examiner*—Abul K. Azad
(74) *Attorney, Agent, or Firm*—Meyertons Hood Kivlin Kowert & Goetzel, P.C.; B. Noël Kivlin

(57) ABSTRACT

The present invention provides a method and apparatus for defining verbs and adverbs. The method includes creating at least one of a verb and adverb, wherein the at least one of a verb and adverb are adapted to form sequences and the sequences are adapted to create errors in a system. The method further includes defining attributes of the at least one of a verb and adverb.

20 Claims, 10 Drawing Sheets

US 7,254,528 B2

TOOL FOR DEFINING VERBS AND ADVERBS IN A FAULT INJECTION TEST CREATION ENVIRONMENT

This application claims the benefit of U.S. Provisional Application No. 60/380,421 entitled "TOOL FOR DEFINING VERBS AND ADVERBS IN A FAULT INJECTION TEST CREATION ENVIRONMENT", filed May 14 2002.

BACKGROUND OF THE INVENTION

1. Field of the Invention

This invention relates generally to processor-based systems, and more particularly, to defining verbs and adverbs in a processor-based system.

2. Description of the Related Art

Reliability and availability have become increasingly important in a modern, computer-dependent society. Recent years have seen a significant number of advances in processor-based systems and communications technologies, as well as a sharp decline in their cost. These developments, coupled with the growing availability of network and Internet connections, have resulted in a greater reliance by society on processor-based systems and the services they provide. In many applications where processor-based systems are used, outages and malfunction can be expensive. Common examples where an unreliable or unavailable processor-based system may be problematic include telecommunications switching systems and bank transaction systems.

Fault tolerance is generally a means of achieving reliable and available systems, among other advantages. A fault tolerant system is generally a system that can provide services notwithstanding the presence of faults. There are two basic levels at which fault tolerance can be applied to a system. At the first level, fault tolerance has been used to compensate for faults in processor-based system resources (i.e., "hardware"). By managing extra hardware resources, the processor-based system generally increases its ability to continue operation. Hardware fault tolerance measures include redundant communications, replicated processors, additional memory, and redundant power/energy supplies. A second level of fault tolerance recognizes that a fault tolerant hardware platform does not, in and of itself, guarantee high availability to the system user. It may still be useful to structure the processor-based system software to compensate for faults such as changes in program or data structures due to transients or design errors. This is software fault tolerance. Mechanisms of software fault tolerance include checkpoint/restart, recovery blocks, and multiple-version programs. It is important to note that fault tolerance measures may be applied to at least one of the two levels.

In determining fault tolerance measures for a computer system, the dependability of the system may need to be evaluated. An exemplary method of evaluating the dependability of a system includes fault injection. Fault injection generally involves the deliberate insertion of faults or errors (i.e., fault injection code fragments) in processor-based systems to observe its effects on system behavior. The observations may be used in evaluating existing fault tolerant mechanisms and/or they may be used in developing new fault tolerant mechanisms. Fault injection generally aims to detect the presence of design and implementation faults and to quantify the confidence that can be attributed to a system by estimating the number and the consequences of possible faults in the system.

Traditionally, fault injection code fragments, which are generally written in a lower level programming language (e.g., assembly language) may not be easily understood by a user who did not write the fragments, substantially limiting the value of the fragments. Furthermore, traditional fault injection methods do not allow easy manipulation of fault injection code fragments, such as combining various fault injection code fragments.

SUMMARY OF THE INVENTION

In one aspect of the present invention, a method is provided for defining verbs and adverbs. The method includes creating at least one of a verb and adverb, wherein the at least one of a verb and adverb are adapted to form sequences and the sequences are adapted to create errors in a system, and defining attributes of the at least one of a verb and adverb.

In another aspect of the present invention, a method is provided for defining verbs and adverbs. The method includes creating at least one of a verb and adverb, wherein the at least one of a verb and adverb are adapted to form sequences and the sequences are adapted to create errors in a system, and defining the at least one of a verb and adverb by associating the at least one of a verb and adverb with existing sequences.

BRIEF DESCRIPTION OF THE DRAWINGS

The invention may be understood by reference to the following description taken in conjunction with the accompanying drawings, in which like reference numerals identify like elements, and in which.

Figure 1:
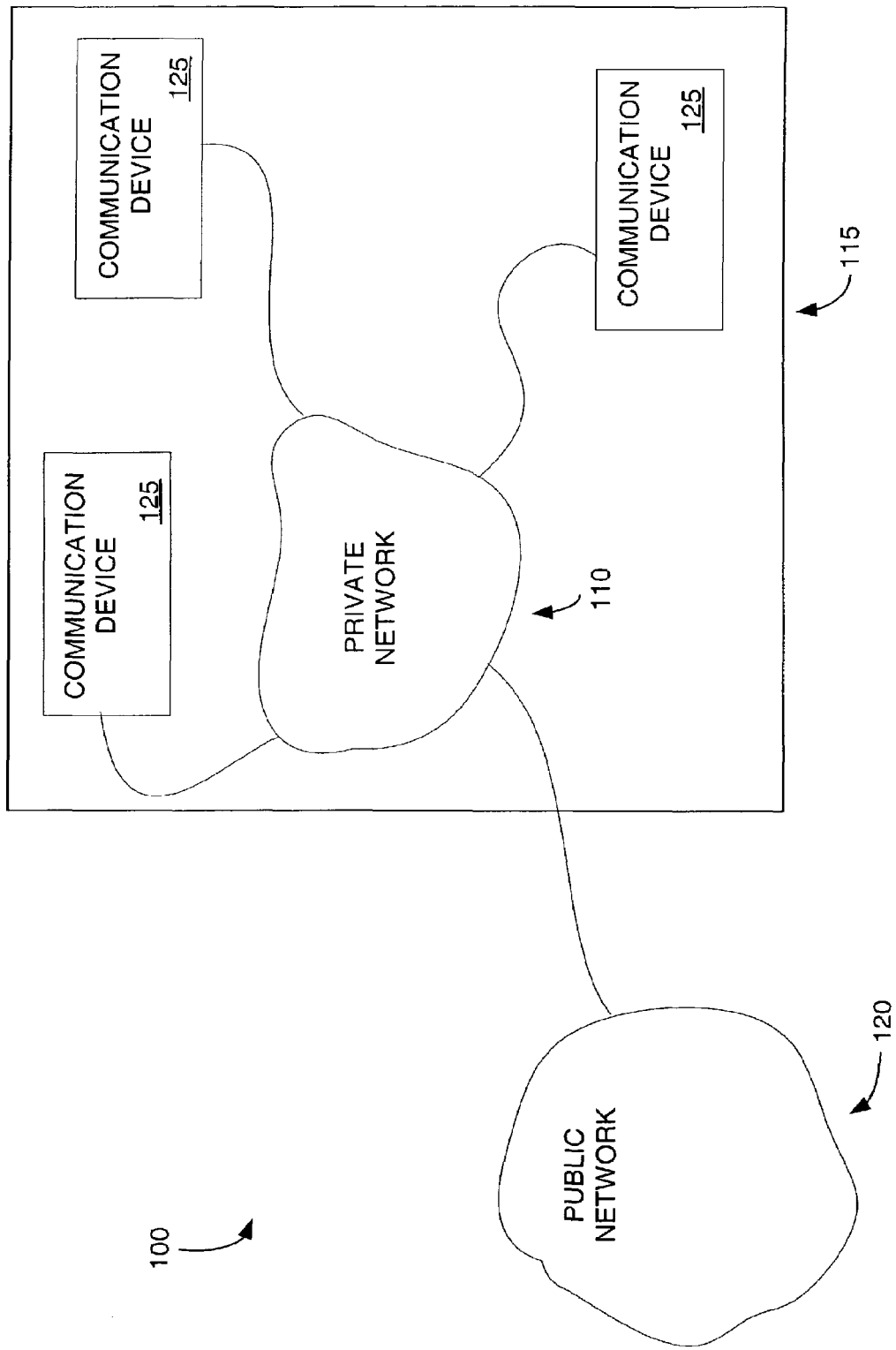
FIG. 1 shows a block diagram of a communications system that includes various nodes or network elements that are capable of communicating with each other, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows a stylized block diagram of an exemplary communication system 100 comprising various nodes or network elements that are capable of communicating with each other. The exemplary network elements and the manner in which they are interconnected are for illustrative purposes only, and are not intended to limit the scope of the invention. A variety of other arrangements and architectures are possible in further embodiments.

The communication system 100 may include a private network 110 that is located in a community 115 coupled to a public network 120 (e.g., the Internet). A "private network" refers to a network that is protected against unauthorized general public access. A "network" may refer to one or more communications networks, links, channels, or paths, as well as routers or gateways used to pass data between elements through such networks, links, channels, or paths. Although reference is made to "private" and "public" networks in this description, further embodiments may include networks without such designations. For example, a community 115 may refer to nodes or elements coupled through a public network 120 or a combination of private and public networks 110, 120.

The nodes or elements may be coupled by a variety of means. The means, well known to those of ordinary skill in the art, may comprise both physical electronic connections such as wires and/or cables and wireless connections such as radio-frequency waves. Although not so limited, the wireless data and electronic communications link/connection may also comprise one of a variety of links or interfaces, such as a local area network ("LAN"), an Internet connection, a telephone line connection, a satellite connection, a global positioning system ("GPS") connection, a cellular connection, a laser wave generator system, any combination thereof, or equivalent data communications links.

In one embodiment, the communication protocol used in the various networks may be the Internet Protocol ("IP"), as described in Request for Comments ("RFC") 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks may communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

The system 100 may comprise a plurality of communication devices 125 for communicating with the networks 110, 120. The communications devices 125 may comprise computers, Internet devices, or any other electronic device capable of communicating with the networks. Further examples of electronic devices may comprise telephones, fax machines, televisions, or appliances with network interface units to enable communications over the private network 110 and/or the public network 120.

In the course of normal operations, hardware and software components of the one or more communication devices 125 may fail to meet their promises. In particular, if a distributed system is designed to provide its user with a plurality of services, for example, the system has failed when one or more of those services cannot be provided, in whole or in part. As utilized hereinafter, the term "error" refers to a part of the system's state that may lead to failure. For example, when transmitting packets across a network, a portion of the packets may be damaged (e.g., a "1" bit incorrectly becomes a "0" bit). As utilized hereinafter, the term "fault" refers to a cause of the error. For example, a wrong or bad transmission medium may have caused the portion of the packets to be damaged.

Although errors are generally undesirable, there are circumstances in which it may be desirable to cause errors in one or more communication devices 125, a process hereinafter referred to as "fault insertion" or "fault injection." For example, the reliability of the communication device 125 may be tested by creating one or more code fragments (i.e., faults) that may cause errors in the communication device 125 and by providing the code fragments to the communication device 125. Thus, in accordance with one embodiment of the present invention, complex sequences of faults, such as those that may be generated by the plurality of software applications and hardware components in the communication device 125, may be formed using elements of a fault injection language. The fault sequences may be provided to one or more communication devices 125 and then executed on the communication devices 125.

Figure 2:
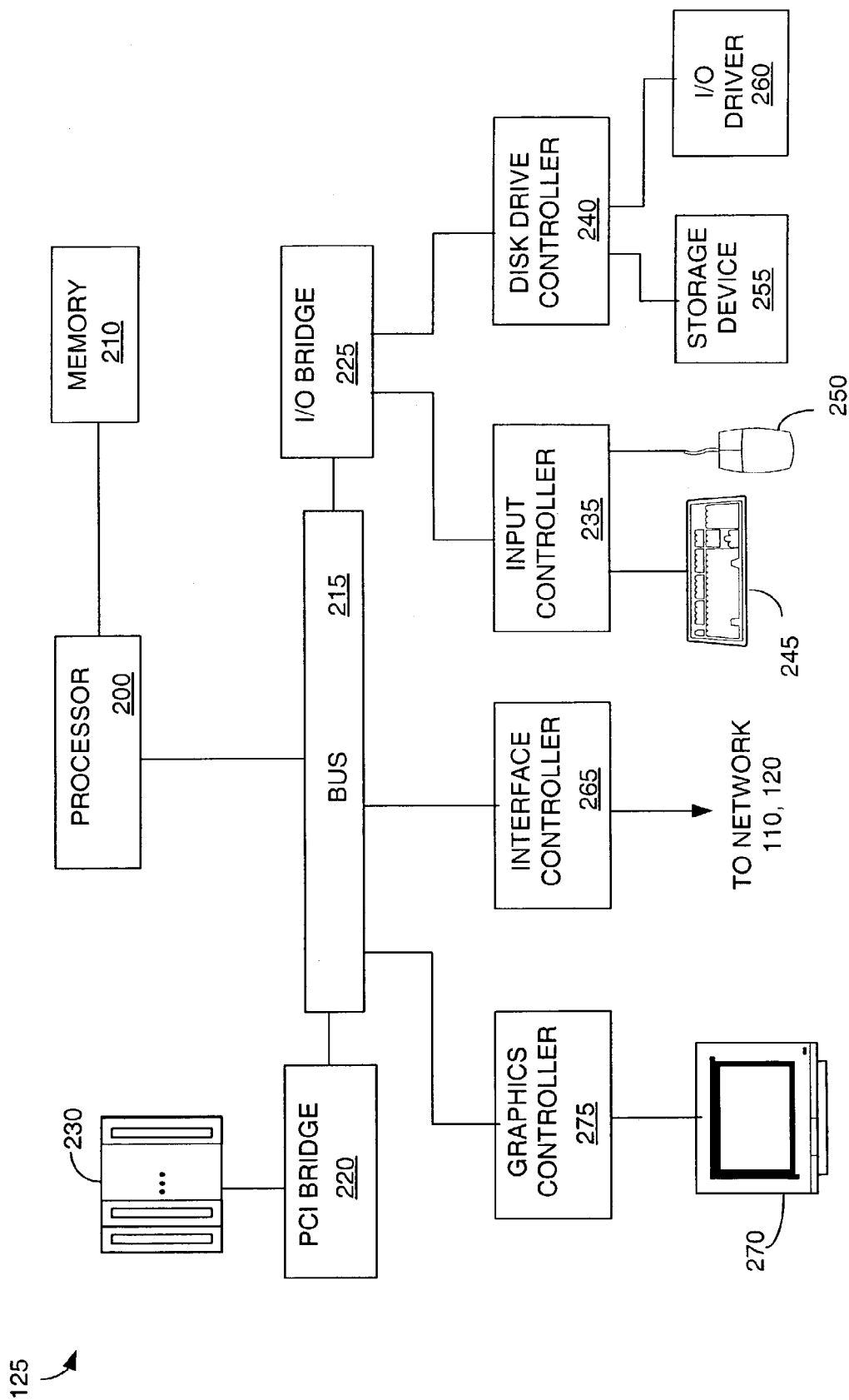
FIG. 2 shows a block diagram of one embodiment of a communication device that may be employed in the communications network shown in FIG. 1.

FIG. 2 shows a block diagram of one embodiment of the communication device 125 of FIG. 1. For example, the communication device 125 may be a workstation such as the Sun Blade® Workstation. The communication device 125 may comprise at least one processor 200 adapted to perform one or more tasks or to spawn one or more processes. Although not so limited, in one embodiment, the processor 200 may be a 500-MHz UltraSPARC-IIe® processor. The processor 200 may be coupled to at least one memory element 210 adapted to store information. For example, the memory element 210 may comprise 2-gigabytes of error-correcting synchronous dynamic random access memory ("SDRAM") coupled to the processor 200 via one or more unbuffered SDRAM dual in-line memory module ("DIMM") error-correcting slots (not shown).

In one embodiment, the memory element 210 may be adapted to store a variety of different forms of information including, but not limited to, one or more of a variety of software programs, data produced by the software and hardware, and data provided by the private and public networks 110, 120. Although not so limited, the one or more software programs stored in the memory element 210 may include software applications (e.g., database programs, word processors, and the like) and at least a portion of an operating system (e.g., the Solaris® operating system). The source code for the software programs stored in the memory element 210 may, in one embodiment, comprise one or more instructions that may be used by the processor 200 to perform various tasks or spawn various processes.

The processor 200 may be coupled to a bus 215 that may transmit and receive signals between the processor 200 and any of a variety of devices that may also be coupled to the bus 215. For example, in one embodiment, the bus 215 may be a 32-bit-wide, 33-MHz peripheral component interconnect ("PCI") bus. A variety of devices may be coupled to the bus 215 via one or more bridges, which may include a PCI bridge 220 and an input/output ("I/O") bridge 225. It should, however, be appreciated that, in alternative embodiments, the number and/or type of bridges may change without departing from the scope of the present invention. In one embodiment, the PCI bridge 220 may be coupled to one or more PCI slots 230 that may be adapted to receive one or more PCI cards, such as Ethernet cards, token ring cards, video and audio input/output devices, small computer system interface ("SCSI") adapters, and the like.

The I/O bridge 225 may, in one embodiment, be coupled to one or more controllers, such as an input controller 235 and a disk drive controller 240. The input controller 235 may control the operation of such devices as a keyboard 245, a mouse 250, and the like. The disk drive controller 240 may similarly control the operation of a storage device 255 and an I/O driver 260 such as a tape drive, a diskette, a compact disk drive, and the like. It should, however, be appreciated that, in alternative embodiments, the number and/or type of controllers that may be coupled to the I/O bridge 225 may change without departing from the scope of the present invention. For example, the I/O bridge 225 may also be coupled to audio devices, diskette drives, digital video disk drives, parallel ports, serial ports, a smart card, and the like.

An interface controller 265 may be coupled to the bus 215. In one embodiment, the interface controller 265 may be adapted to receive and/or transmit packets, datagrams, or other units of data over the private or public networks 110, 120, in accordance with network communication protocols such as the Internet Protocol ("IP"), other versions of IP like IPv6, or other packet-based standards as described above. Although not so limited, in alternative embodiments, the interface controller 265 may also be coupled to one or more IEEE 1394 buses, FireWire® ports, universal serial bus ports, programmable read-only-memory ports, and/or 10/100Base-T Ethernet ports.

One or more output devices such as a monitor 270 may be coupled to the bus 215 via a graphics controller 275. The monitor 270 may be used to display information provided by the processor 200. For example, the monitor 270 may display documents, 2-D images, or 3-D renderings.

For clarity and ease of illustration, only selected functional blocks of the communication device 125 are illustrated in FIG. 2, although those skilled in the art will appreciate that the communication device 125 may comprise additional or fewer functional blocks. Additionally, it should be appreciated that FIG. 2 illustrates one possible configuration of the communication device 125 and that other configurations comprising different interconnections may also be possible without deviating from the scope of the present invention. For example, in an alternative embodiment, the communication device 125 may include additional or fewer bridges 220, 225. As an additional example, in an alternative embodiment, the interface controller 265 may be coupled to the processor 200 directly. Similarly, other configurations may be possible.

Figure 3:
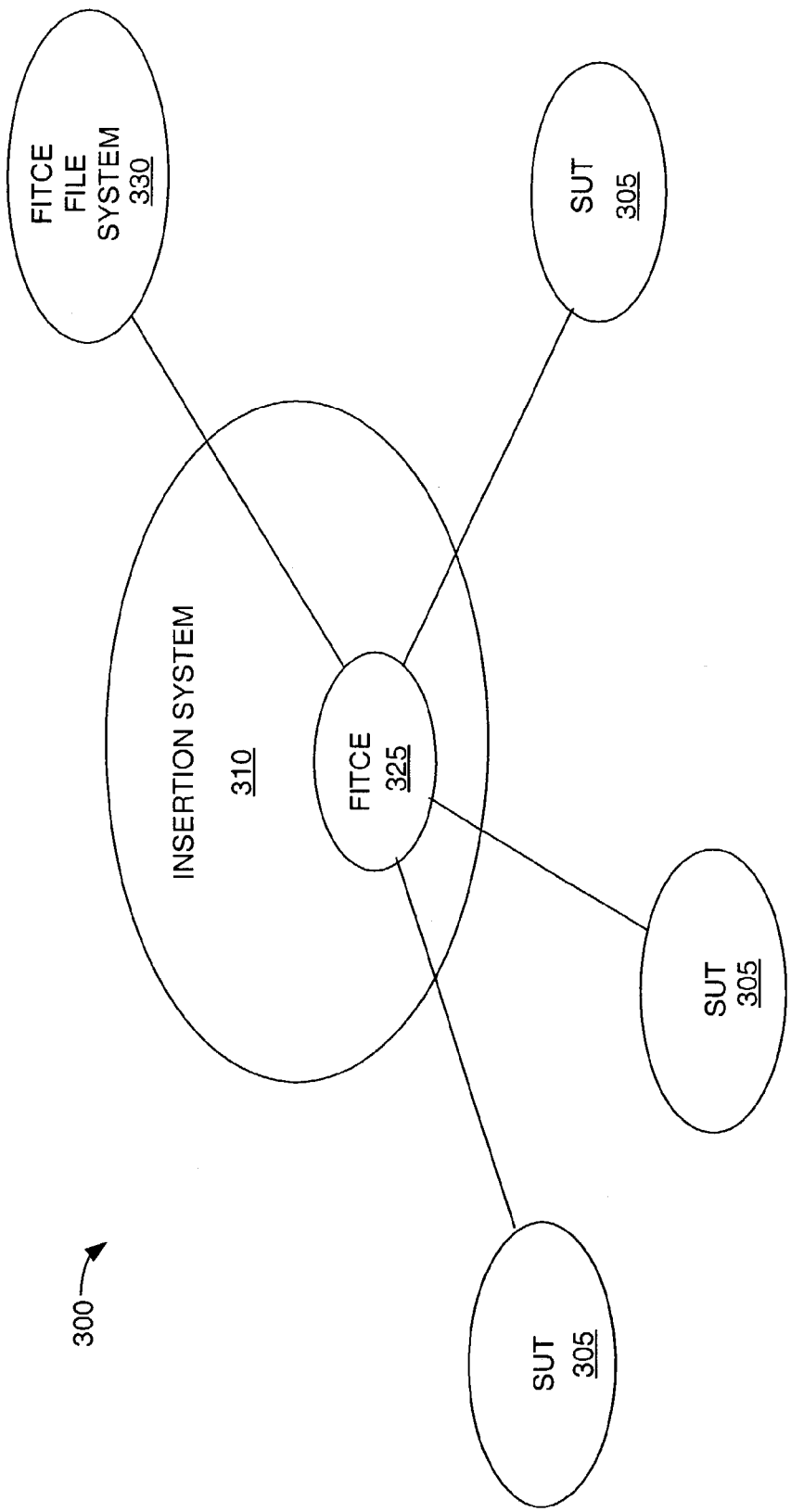
FIG. 3 shows a block diagram of an exemplary fault insertion system that may be used to insert faults into one or more systems under test, such as the communication device shown in FIG. 2, in accordance with one embodiment of the present invention.

Referring now to FIG. 3, a block diagram of an exemplary fault insertion system 300 is shown. The fault insertion system 300 may, in one embodiment, comprise one or more systems under test ("SUTs") 305 and at least one insertion system 310. The systems 305, 310 may be formed of one or more communications devices 125, which may be coupled by a network 110, 120. The systems 305, 310 and the manner in which they are interconnected in FIG. 3A are for illustrative purposes only, and thus the systems 305, 310 may, in alternative embodiments, be interconnected in any other desirable manner. For example, the insertion system 310 may be coupled to the one or more SUTs 305 by a private or public network 110, 120, as described above. However, it should also be appreciated that the SUTs 305 and the insertion system 310 may, in alternative embodiments, be implemented in a single communication device 125.

Figure 4A:
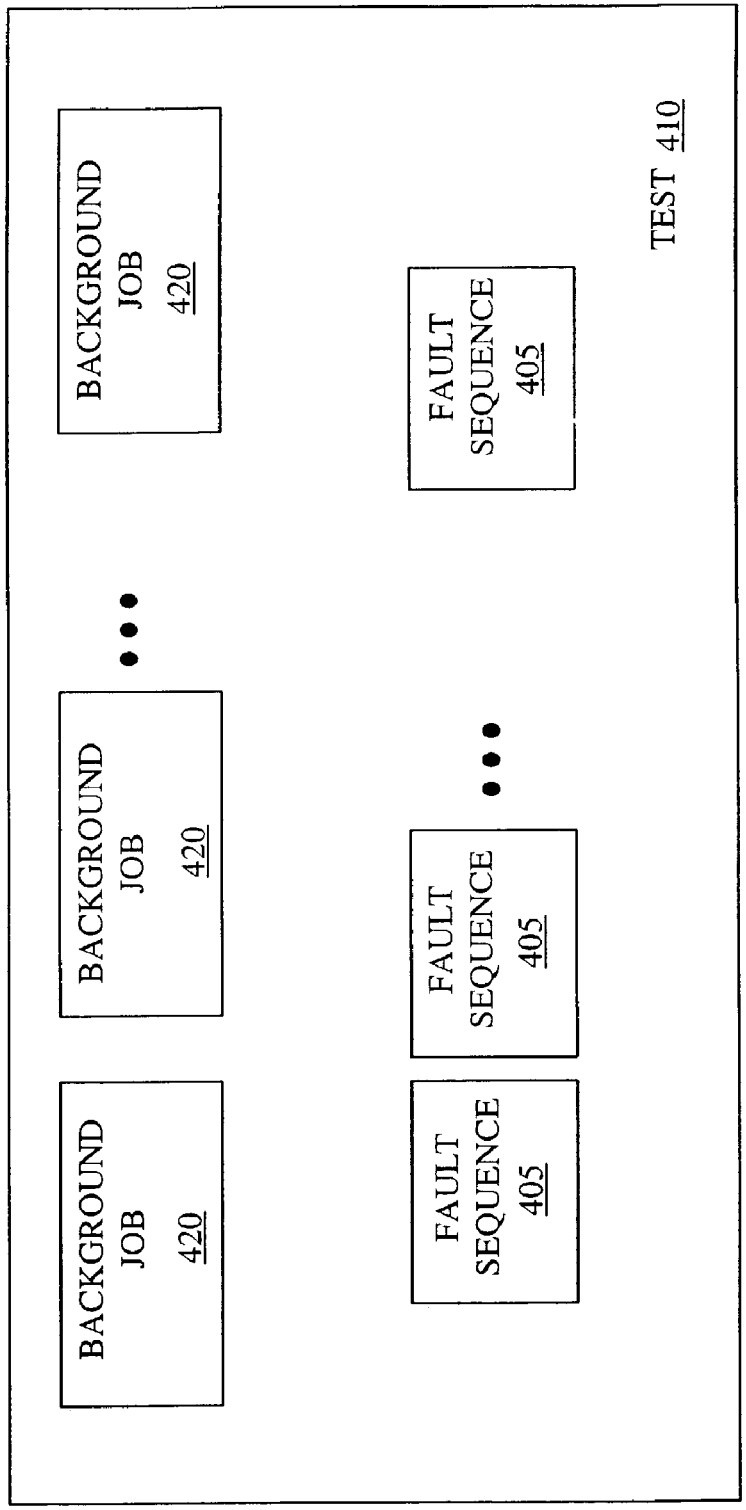
FIGS. 4A-B show block diagrams of a suite that may be created by the fault insertion system shown in FIG. 3, in accordance with one embodiment of the present invention.
Figure 5:
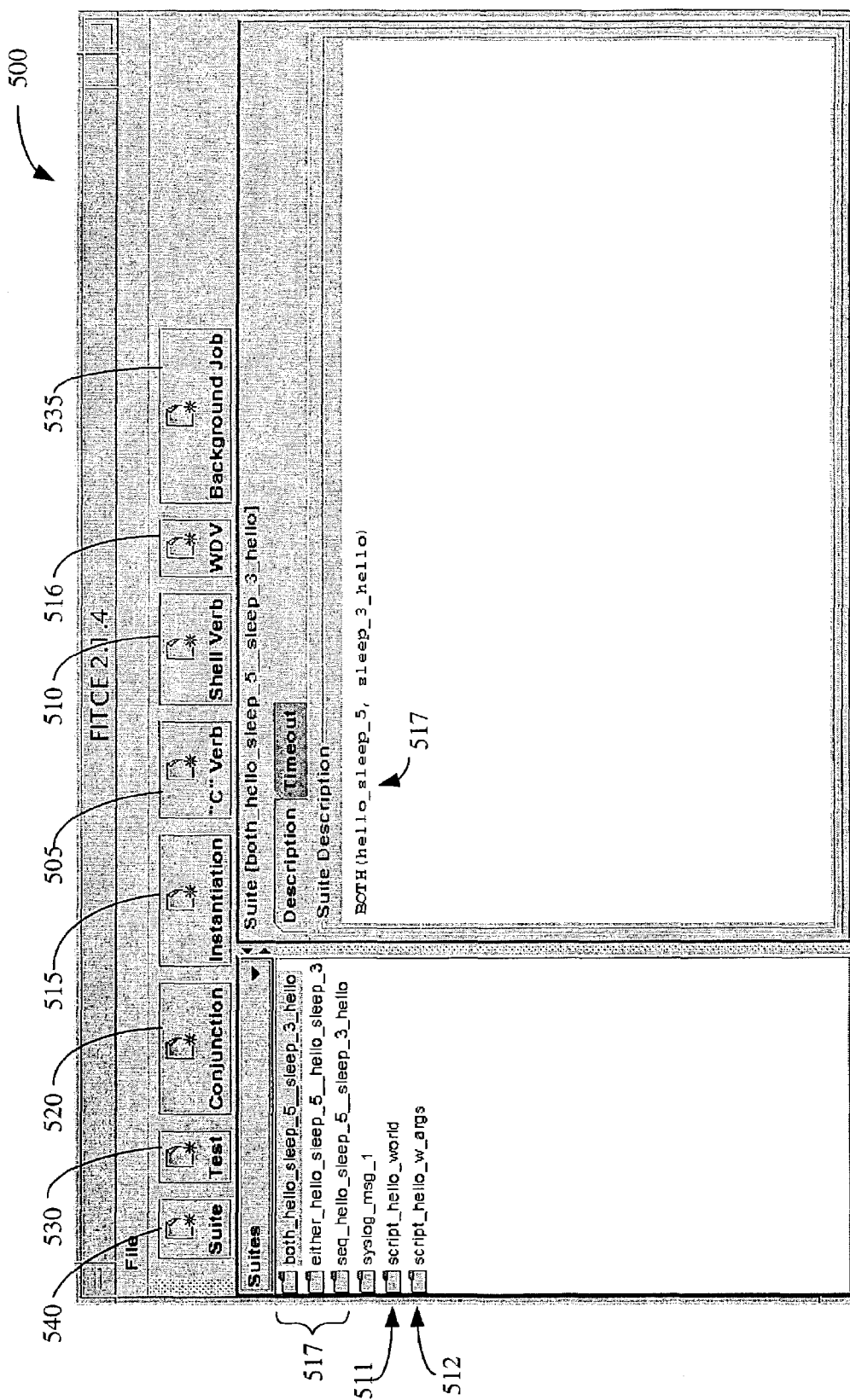
FIG. 5 shows an illustration of a graphical user interface (GUI) that may be used by the fault insertion system shown in FIG. 3, in accordance with one embodiment of the present invention.

The insertion system 310 may include a fault insertion test creation environment ("FITCE") 325, in accordance with one embodiment of the present invention. Although not so limited, the FITCE 325 may be a visual programming environment that may assist a user to create one or more fault sequences 405, as shown in FIG. 4A. In one embodiment, the visual programming environment provided by the FITCE 325 may provide a graphical user interface ("GUI"), such as a FITCE GUI 500 main window shown in FIG. 5, which may enable the user to create the fault sequences 405. In alternative embodiments, the user may create the fault sequences 405 using any of a variety of editing, programming, or other applications well known to those of ordinary skill in the art. The fault sequences 405 may be formed from one or more templates (not shown) of a FITCE language. In one embodiment, the templates may be one or more code fragments in the C programming language or shell scripts. However, it will be appreciated that, in alternative embodiments, the elements may be formed in any of a variety of programming languages (e.g., C++, Visual Basic, and Java) or scripts (e.g., Perl, JavaScript, or AppleScript). Although not so limited, in one embodiment, the templates may be created using the FITCE GUI 500 by clicking on a GUI button, such as a "C" Verb button 505 or a Shell Verb button 510, as shown in FIG. 5.

Although not so limited, in one embodiment, templates may include any of a variety of FITCE language elements. For example, the FITCE language elements may include operands, such as "verbs" and "adverbs". In one embodiment, verbs may be code fragments that implement an action. For example, the verb may be a code fragment written in the C programming language that includes instructions that when executed enable the SUT 305 to write "Hello, world!" to the monitor 270 shown in FIG. 2. In other embodiments, the verb may inject a fault in a running system. In one embodiment, adverbs may be code fragments that modify the sequence of actions implemented by the verbs. For example, the adverb may instruct the SUT 305 to write "Hello, world!" substantially after the SUT 305 completes initialization. Although not so limited, in one embodiment, verbs and adverbs may comprise user-defined code.

Referring back to FIG. 3, the FITCE language elements may be stored in a FITCE file system 330. In one embodiment, the FITCE file system 330 may be integrated in the systems 305, 310, although for the sake of clarity the FITCE file system 330 is depicted as a stand-alone entity in FIG. 3. In alternative embodiments, portions of the FITCE file system 330 may be distributed among the one or more SUTs 305, the insertion system 310, and/or other systems (not shown). Although the FITCE file system 330 is depicted as a subset of the insertion system 310 in FIG. 3, in yet another embodiment, at least a portion of the FITCE file system 330 may be implemented as a centralized file system (not shown) that is separate from and unaffected by the insertion system 310. Templates may be named and stored in the FITCE file system 330. For example, the fault sequence 405 that includes instructions that when executed enable the SUT 305 to write "Hello, world!" may be named script_hello_world 511 and stored in the FITCE file system 330. Templates may also be provided by other users or with the shipped product.

Templates may, in one embodiment, accept one or more variables and/or arguments. The variables and/or arguments may, in one embodiment, be provided to the template by the user, a process that will be referred to hereinafter as "instantiating" the template. For example, the user may instantiate a print template by providing the string "Hello, world!" to the print template, which may enable the SUT 305 to write "Hello, world!" to the monitor 270 shown in FIG. 2. The template may be named and stored for re-use. For example, the print template that may accept a variable such as the string "Hello, world!" may be named script_hello_w_args 512 (see FIG. 5) and stored in the FITCE file system 330. Although not so limited, in one embodiment, the variables in the templates may be instantiated using the FITCE GUI 500 by clicking on a GUI button, such as an Instantiation button 515 or a WDV button 516, as shown in FIG. 5.

A plurality of templates may be conjoined to form a complex template 517. Although not so limited, in one embodiment, the plurality of templates may be conjoined using at least one of an SEQ, a BOTH, and an EITHER conjunction. The SEQ conjunction may enable the SUT 305 to execute two templates in the complex template 517 sequentially. The BOTH conjunction may enable the SUT 305 to execute the two templates in the complex template 517 in parallel. Further execution after the BOTH conjunction occurs after both of the two templates in the conjunction are finished executing. The EITHER conjunction may enable the SUT 305 to execute the two templates in the complex template 517 in parallel. Further execution after the EITHER conjunction occurs after either of the two templates in the conjunction is finished executing. In one embodiment, the plurality of templates may be conjoined using the FITCE GUI 500 by clicking on a GUI button, such as a Conjunction button 520, as shown in FIG. 5. The complex template 517 may also be named and stored in the FITCE file system 330.

FIG. 4A shows a block diagram of a test 410 that may be created by the fault insertion system 300. One or more fault sequences 405, such as script_hello_world 511 and the instantiated complex templates 517, may be used to create the test 410. In one embodiment, the test 410 may be able to execute on the SUT 305 and insert the fault sequences 405 into the SUT 305. Although not so limited, in one embodiment, the test 410 may be formed using the FITCE GUI 500 by clicking on a GUI button, such as a Test button 530, as shown in FIG. 5. The test 410 may also include one or more background jobs 420. For example, the one or more background jobs 420 may include benchmarks such as the SpecWeb99 benchmark for web server, the SpecJVM98 benchmark for Java Virtual Machines, online transaction processing benchmarks provided by the Transaction Processing Performance Council, and the like. Although not so limited, in one embodiment, the background jobs 420 may be formed using the FITCE GUI 500 by clicking on a GUI button, such as a Background Job button 535, as shown in FIG. 5.

Figure 4B:
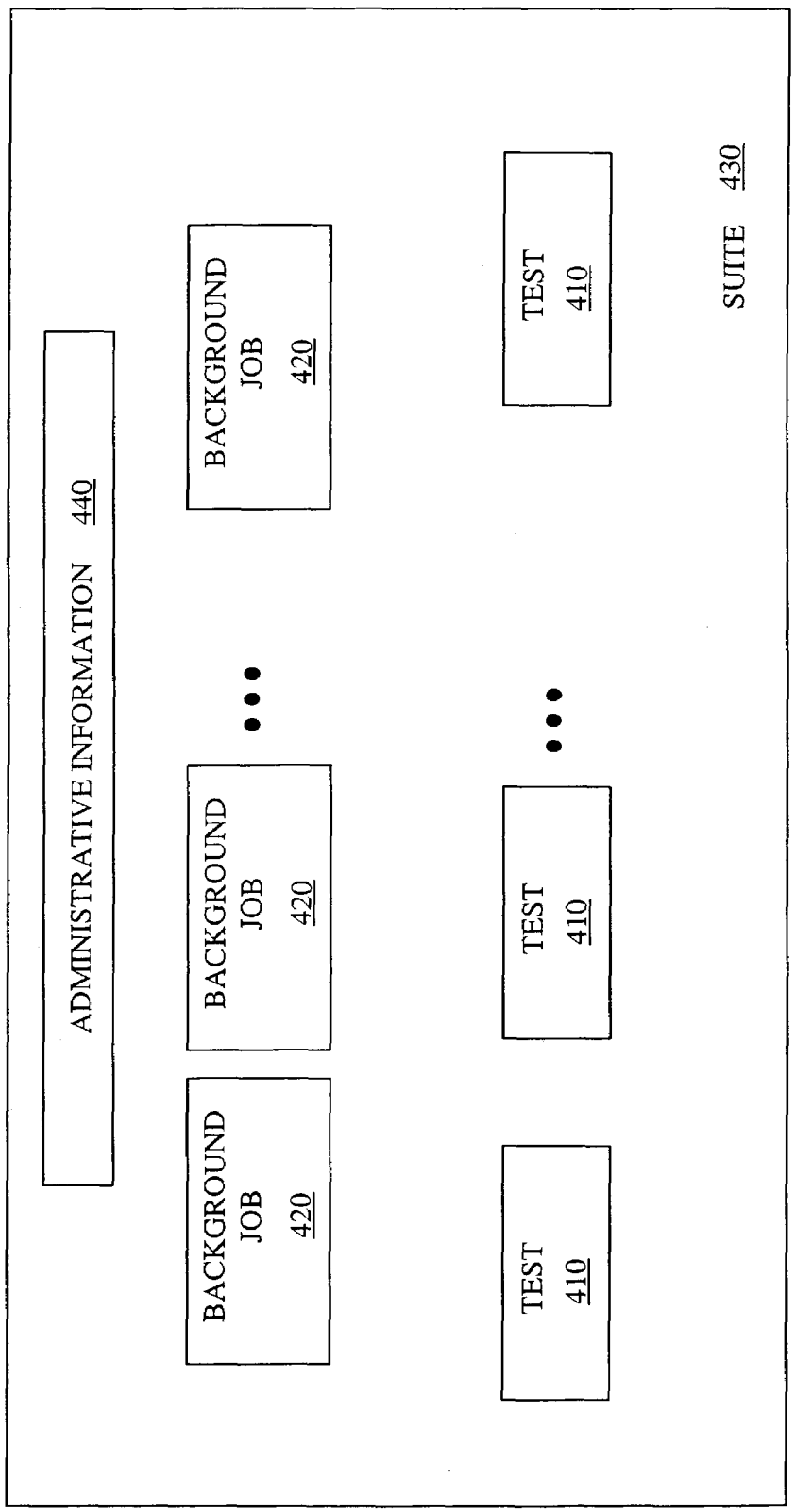

FIG. 4B shows a block diagram of a suite 430 that may be created by the fault insertion system 300. To insert the fault sequences 405 into the SUT 305, the test 410 may be included in the suite 430. In one embodiment, the suite 430 may be a self-contained fault insertion program that may be converted to an executable package that may be run by, for example, the SUT 305 that may be using a Solaris® operating system. The suite 430 may include one or more tests 410, as well as any desirable background jobs 420 and any other desirable administrative information 440 that may be used in any desirable manner before, during, or after the tests 410. For example, the suite 430 may include a description of the function of the suite 430. In another example, the suite 430 may include a timeout value that may determine how long the suite 430 may run. Although not so limited, in one embodiment, the suite 430 may be formed using the FITCE GUI 500 by clicking on a GUI button, such as a Suite button 540, as shown in FIG. 5.

Figure 6:
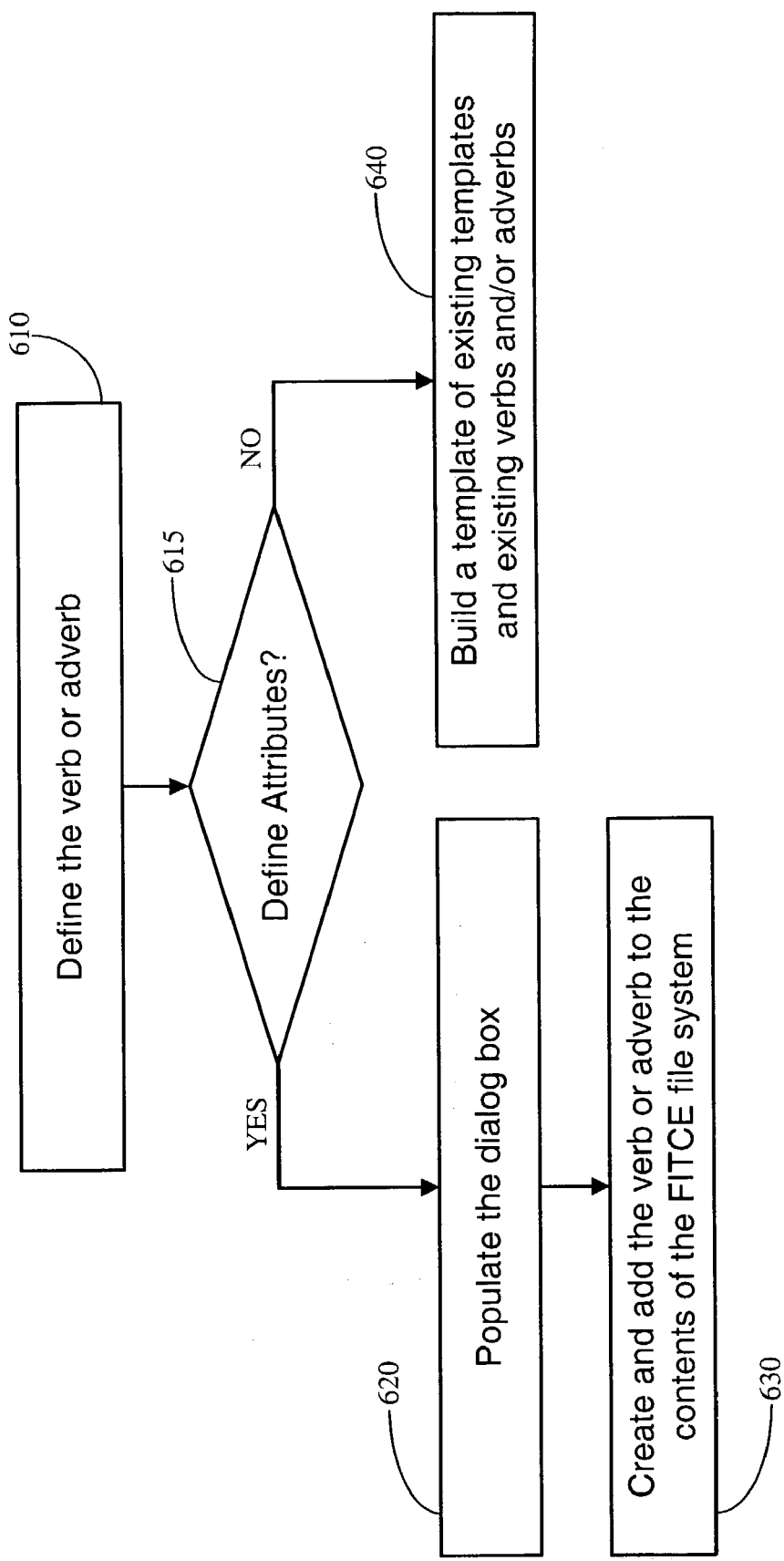
FIG. 6 shows a flow diagram illustrating an exemplary method of defining a verb or adverb, in accordance with one embodiment of the present invention.

FIG. 6 shows a flow diagram illustrating an exemplary method of defining a verb and/or adverb, in accordance with one embodiment of the present invention. The user selects (at 610) to define the verb and/or adverb. In one embodiment, the user may select (at 610) to define the verb and/or adverb by clicking on a GUI button, such as a "C" Verb button 505, as shown in FIG. 5. In one embodiment, clicking on the "C" Verb button 505 may open a dialog box 700 of FIG. 7 that allows a user to define a verb or adverb using the C programming language. Referring back to FIG. 6, the user chooses (at 615) a method of populating the verb and/or adverb. The user may choose (at 615) to define attributes of the verb and/or adverb. The user populates (at 620) the dialog box 700 with attributes of the verb and/or adverb. In one embodiment, populating the dialog box 700 may refer to entering values for attributes of the verb and/or adverb. Although not so limited, other embodiments of populating the dialog box 700 may include any of a variety of interfaces for assigning attributes, including checkboxes and pull-down menus.

The dialog box 700 may be populated (at 620) with four dialog items (i.e., attributes of the verb and/or adverb): name, description, execution context, and execution function. In one embodiment, the name of the verb and/or adverb may be entered in a name window 705. The description of the verb and/or adverb may be entered in a description window 710. The execution context may provide a user a specific context for which the verb and/or adverb is written. Although not so limited, the execution context may be provided for different privilege levels in an operating system. For example, in the UNIX® operating system, the verb and/or adverb may be executed in a kernel mode or a user mode. In one embodiment, the kernel mode may include privileged processor activities, such as low level services, system data management, and hardware interfaces. The kernel mode generally removes any direct control from the user. The user mode, however, may include all other activities. The user may choose an execution context by clicking on a GUI button, such as an execution context button 715.

The execution function may inject a fault into a running system. The user may choose an execution function by clicking on a GUI button, such as an execution function button 720. In one embodiment, the execution function may execute after an initialization function completes. The initialization function may provide any of a variety of functions the user may need prior to injecting the fault into the system.

Figure 7:
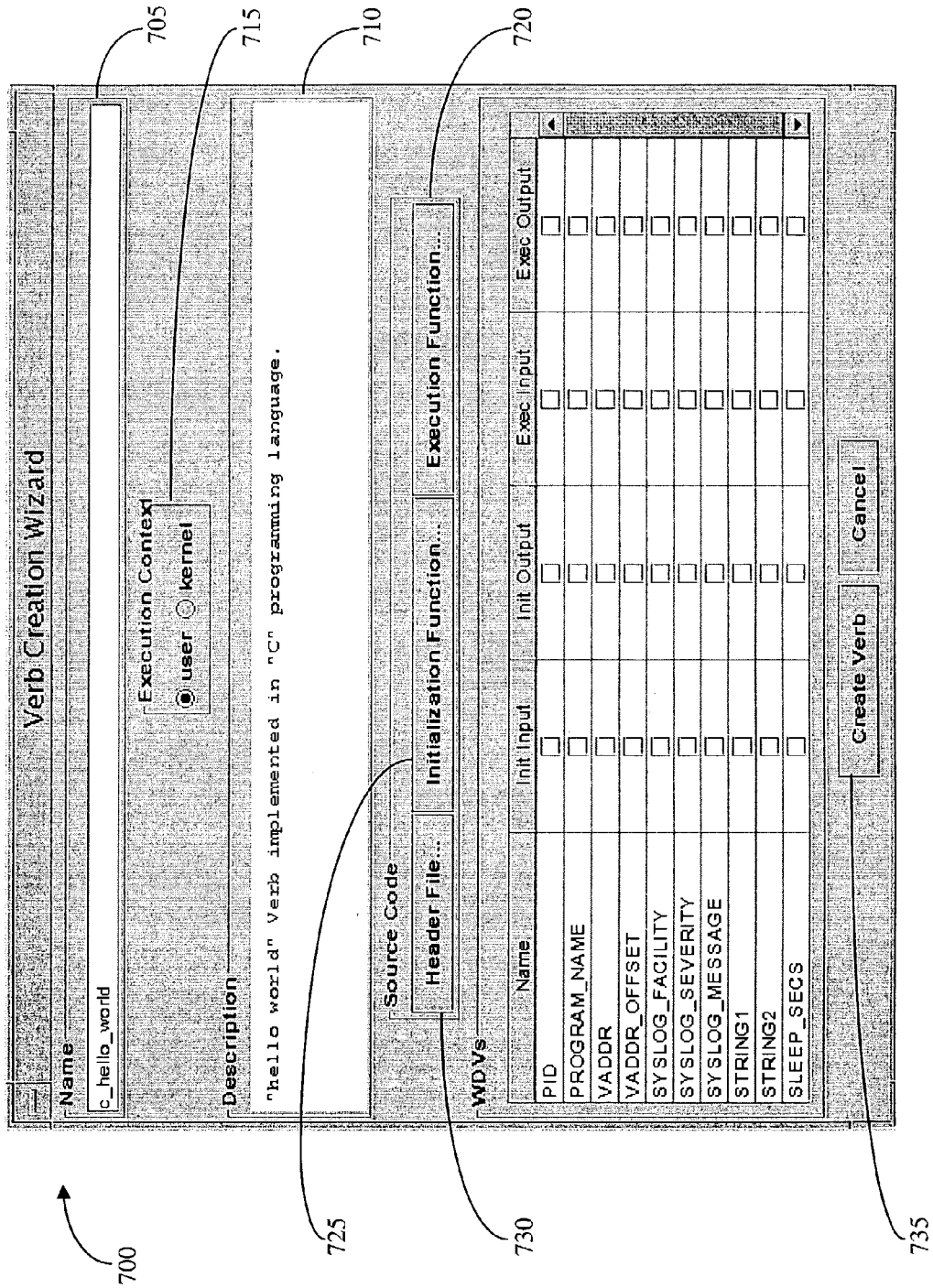
FIG. 7 shows an illustration of a graphical user interface (GUI) that may be used by the fault insertion system shown in FIG. 3, in accordance with one embodiment of the present invention.

For example, the initialization function may reset a counter that the execution function may need to properly inject the fault into the system. The user may choose an initialization function by clicking on a GUI button, such as an initialization function button 725, as shown in FIG. 7. Although not illustrated in FIG. 7, in one embodiment, the user may choose a post-execution function by clicking on a GUI button (not shown). The post-execution function may include any of a variety of functions the user may execute after injecting the fault into the system. For example, if the execution function injects a fault into a hardware device during a boot-up process, the post-execution function may include other tasks in the boot-up process, such as booting the operating system.

Figure 8:
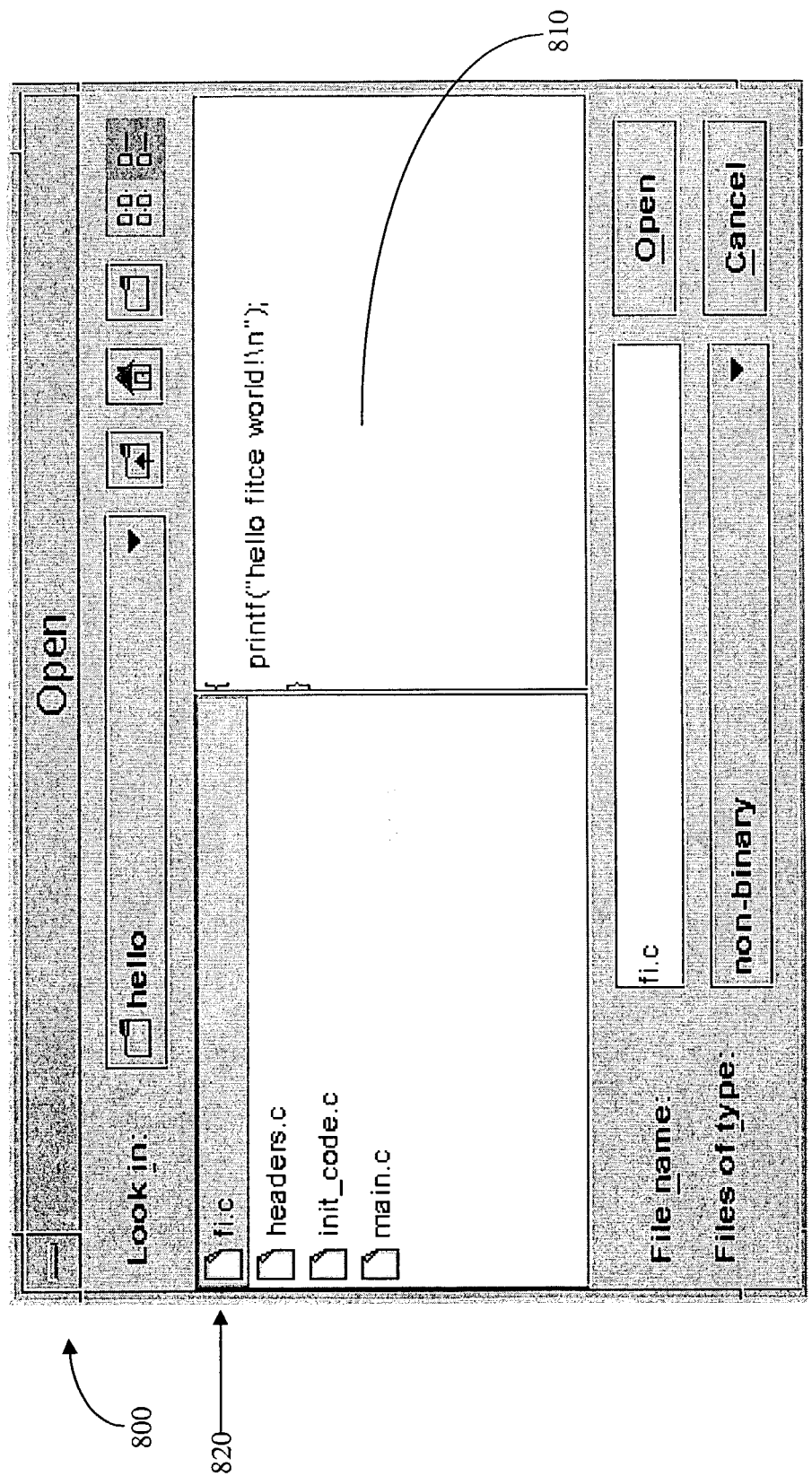
FIG. 8 shows an illustration of a graphical user interface (GUI) that may be used by the fault insertion system shown in FIG. 3, in accordance with one embodiment of the present invention.

In one embodiment, by clicking on the execution function button 720, the user may open a file chooser dialog 800, as shown in FIG. 8. Using the file chooser dialog 800, the user may navigate the file system and find the file containing the source code for the execution function. Furthermore, the user may use the file chooser viewer 810 to confirm the contents of a particular file. For example, the contents of a file "fi.c" 820 are shown in the file chooser viewer 810, as illustrated in FIG. 8.

Referring back to FIG. 7, it should be appreciated that the dialog box 700 may comprise more or fewer dialog items, in accordance with conventional practice. Furthermore, the dialog box 700 may comprise other dialog items. Other dialog items may include a header file and a well-defined variable ("WDV"). A header file, in one embodiment, may be a C programming language file containing definitions and declarations needed by the verb. The user may choose a header file by clicking on a GUI button, such as a header file button 730 of FIG. 7. The WDV, in one embodiment, may be a user-defined symbol or name comprising any of a variety of data types in accordance with conventional practice. Although not so limited, data types of the WDV may include integers, floating-point numbers, and characters. The WDV may be used in any of a variety of contexts. For example, the WDV may be used to store values generated by a verb.

Referring back to FIG. 6, the user creates (at 630) and adds the verb or adverb to the contents of the FITCE file system 330 of FIG. 3. The user may create (at 630) and add the verb or adverb to the contents of the FITCE file system 330 of FIG. 3 by clicking on a create verb button 735 of FIG. 7. Once the verb or adverb is in the system, the verb or adverb may be used in any of a variety of ways in accordance with the present invention. For example, the verb or adverb may be used to form complex templates 517 of FIG. 5, comprising any of a variety of combinations of one or more verbs and/or adverbs (described in greater detail in FIG. 9 below). As mentioned, complex templates 517 may be formed using conjunctions, such as the SEQ, the BOTH, and the EITHER conjunctions.

Figure 9:
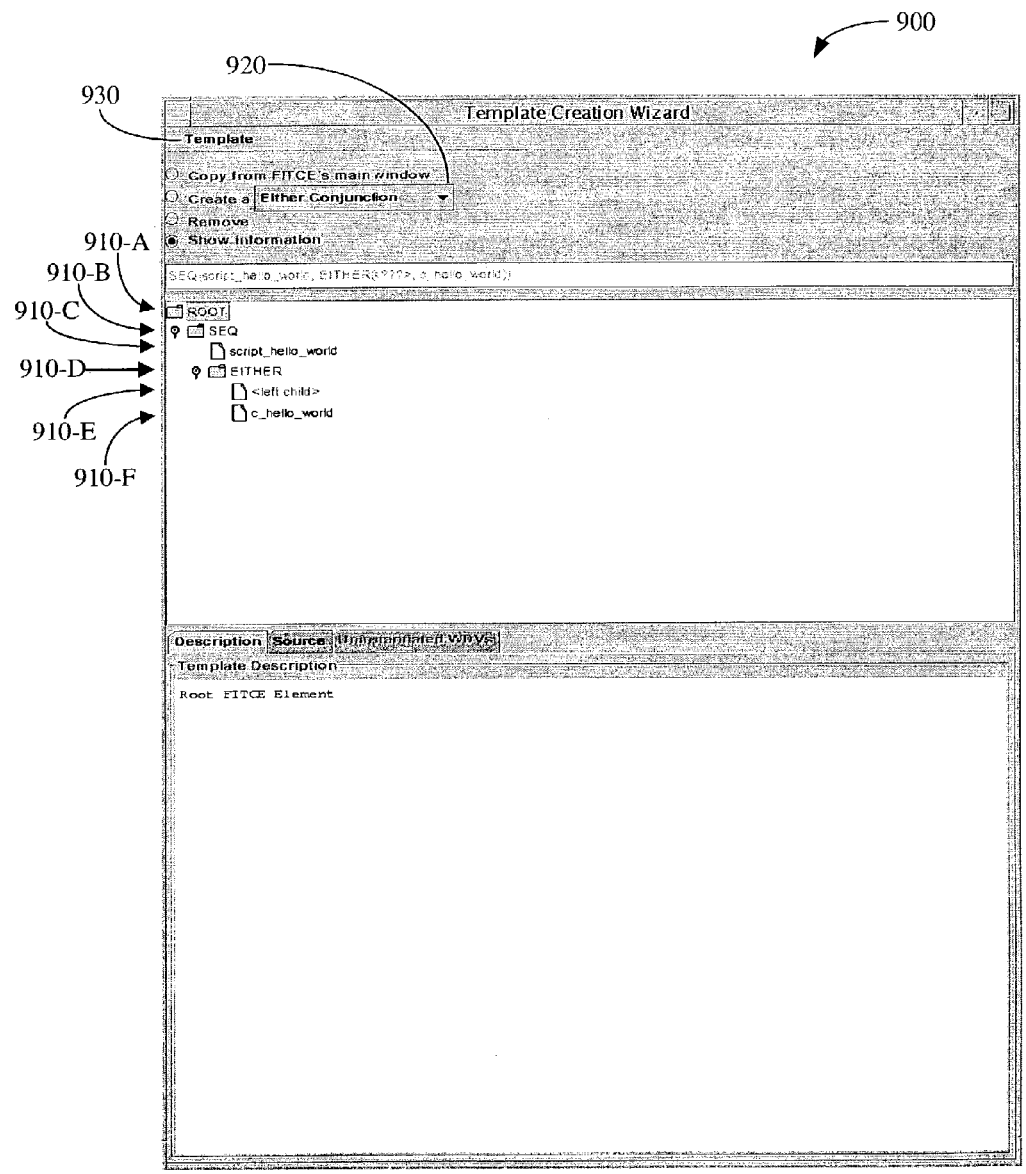
FIG. 9 shows an illustration of a graphical user interface (GUI) that may be used by the fault insertion system shown in FIG. 3, in accordance with one embodiment of the present invention.

Referring back to FIG. 6, the user may choose (at 615) not to define attributes of the verb and/or adverb. The user builds (at 640) a template from existing templates and existing verbs and/or adverbs. Although not so limited, the template may be created using a binary tree. In one embodiment, the tree may be created in a tree box 900, of FIG. 9. The tree box 900 may allow a user to create a new template from existing (i.e., previously created) templates and/or from existing verbs and/or adverbs. The template may be graphically depicted as a binary tree 910. It should be appreciated, however, that any type of data structure may be used to implement the present invention, in accordance with conventional practice. The binary tree 910 comprises a root node 910-A named "ROOT." The root node comprises first child 910-B of the conjunction SEQ. As mentioned, the SEQ conjunction may enable two templates to execute sequentially. The SEQ conjunction may be chosen in a node box 920. Although not so limited, the node box 920 may include a pull-down menu containing any of a variety of nonterminal (i.e., non-leaf) nodes, such as the SEQ, the BOTH, and the EITHER conjunctions. The first child SEQ 910-B comprises a left child 910-C of the verb "script_hello_world" and a first right child 910-D of the conjunction EITHER. As mentioned, the EITHER conjunction may enable any of a plurality of templates to execute. The first right child EITHER 910-D comprises an undefined left child 910-E and a second right child 910-F of the verb "c_hello_world." It should be appreciated that FIG. 9 illustrates an incomplete tree, for the sake of simplicity. As is conventional practice in the creation of a binary tree, the binary tree may comprise a plurality of nonterminal nodes. The nonterminal nodes may lead to another nonterminal node or to a leaf node. The tree terminates when all directed edges of a tree eventually lead to a leaf node. In one embodiment, the leaf node may be a verb or an adverb.

Once the tree (i.e., the template) 910 has been created, a name may be given to the template and saved in the FITCE file system 330. The name may be given to the template and saved in the FITCE file system 330 by clicking on a save menu item (not shown) under the template menu 930.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for injecting faults into a system, the method comprising:
   creating at least one of a verb and adverb;
   defining attributes of the at least one of a verb and adverb;
   forming one or more fault sequences from the at least one of a verb and adverb, wherein the at least one of a verb and adverb are adapted to form the one or more fault sequences; and
   providing the one or more fault sequences to the system, wherein the fault sequences are adapted to create errors in the system.

2. The method of claim 1, wherein defining attributes of the at least one verb and adverb comprises populating a dialog box.

3. The method of claim 1, wherein defining attributes comprises defining at least one of a name, an execution, a description, and an execution function.

4. The method of claim 1, further comprising forming a test from the one or more fault sequences, and providing the test to the system, wherein the test is executable on the system to insert the one or more fault sequences into the system for creating errors.

5. The method of claim 1, wherein forming a fault sequence of verbs and adverbs comprises forming templates from the sequence of verbs and adverbs.

6. The method of claim 5, further comprising conjoining a plurality of templates to form a complex template.

7. The method of claim 1, wherein forming a fault sequence of verbs and adverbs comprises using at least one conjunction.

8. A method for injecting faults into a system, the method comprising:
    creating at least one of a verb and adverb, wherein the at least one of a verb and adverb are adapted to form fault sequences;
    defining the at least one of a verb and adverb by associating the at least one of a verb and adverb with existing fault sequences; and
    providing the fault sequences to the system, wherein the fault sequences are adapted to create errors in the system.

9. The method of claim 8, wherein defining the at least one of a verb and adverb by associating the at least one of a verb and adverb with existing fault sequences comprises building a template of at least one of an existing template, an existing verb, and an existing adverb.

10. The method of claim 9, wherein building a template comprises creating a binary tree.

11. An article comprising one or more machine-readable storage media containing instructions that when executed enable a processor to:
    create at least one of a verb and adverb;
    define attributes of the at least one of a verb and adverb;
    form one or more fault sequences from the at least one of a verb and adverb, wherein the at least one of a verb and adverb are adapted to form the one or more fault sequences; and
    provide the one or more fault sequences to a system, wherein the fault sequences are adapted to create errors in the system.

12. The article of claim 11, wherein the instructions when executed enable the processor to populate a dialog box.

13. The article of claim 11, wherein the instructions when executed enable the processor to define at least one of a name, an execution, a description, and an execution function.

14. The article of claim 11, wherein the instructions when executed enable the processor to form templates from the fault sequence of verbs and adverbs.

15. The article of claim 11, wherein the instructions when executed enable the processor to use at least one conjunction.

16. An article comprising one or more machine-readable storage media containing instructions that when executed enable a processor to:
    create at least one of a verb and adverb, wherein the at least one of a verb and adverb are adapted to form fault sequences;
    define the at least one of a verb and adverb by associating the at least one of a verb and adverb with existing fault sequences; and
    provide the fault sequences to the system, wherein the fault sequences are adapted to create errors in the system.

17. The article of claim 16, wherein the instructions when executed enable the processor to build a template of at least one of an existing template, an existing verb, and an existing adverb.

18. The article of claim 17, wherein the instructions when executed enable the processor to create a binary tree.

19. An apparatus for injecting faults into a system, the apparatus comprising:
    means for creating at least one of a verb and adverb;
    means for defining attributes of the at least one of a verb and adverb;
    means for forming one or more fault sequences from the at least one of a verb and adverb, wherein the at least one of a verb and adverb are adapted to form the one or more fault sequences; and
    means for providing the one or more fault sequences to the system, wherein the fault sequences are adapted to create errors in the system.

20. An apparatus for injecting faults into a system, the apparatus comprising:
    means for creating at least one of a verb and adverb, wherein the at least one of a verb and adverb are adapted to form fault sequences;
    means for defining the at least one of a verb and adverb by associating the at least one of a verb and adverb with existing fault sequences; and
    means for providing the fault sequences to the system, wherein the fault sequences are adapted to create errors in the system.

* * * * *